United States Patent [19]
Zittlau

[11] Patent Number: 6,079,801
[45] Date of Patent: Jun. 27, 2000

[54] METHOD FOR ELECTRICALLY ACTUATED BRAKING OF A MOTOR VEHICLE AND ELECTRICALLY ACTUATED BRAKE SYSTEM

[75] Inventor: Dirk Zittlau, Stöckelsberg, Germany

[73] Assignee: Siemens Aktiengesellschaft, Munich, Germany

[21] Appl. No.: 09/179,471

[22] Filed: Oct. 26, 1998

[30] Foreign Application Priority Data

Oct. 24, 1997 [DE] Germany ............................ 197 47 093

[51] Int. Cl.[7] ........................................................ B60T 8/32
[52] U.S. Cl. ........................ 303/150; 188/72.1; 188/158; 188/162; 303/166
[58] Field of Search ..................................... 303/166, 150, 303/148, 149, 174, DIG. 3, DIG. 4, 199, 162, 115.2, 165, 20; 188/156, 158, 162, 72.1, 1.11 R; 701/80, 74, 79, 82, 71, 90; 180/197

[56] References Cited

U.S. PATENT DOCUMENTS

| | | |
|---|---|---|
| 3,967,862 | 7/1976 | Hunter et al. . |
| 4,602,702 | 7/1986 | Ohta et al. ............................. 188/72.1 |
| 4,818,037 | 4/1989 | McEnnan . |
| 5,125,483 | 6/1992 | Kitagawa et al. ..................... 188/72.1 |
| 5,320,422 | 6/1994 | Tsuyama et al. . |
| 5,348,123 | 9/1994 | Takahashi et al. ..................... 188/72.1 |
| 5,385,393 | 1/1995 | Tanaka et al. . |
| 5,411,325 | 5/1995 | Tanaka et al. . |
| 5,513,907 | 5/1996 | Kiencke et al. ........................ 303/150 |
| 5,915,504 | 6/1999 | Döricht .................................. 188/158 |
| 5,944,392 | 8/1999 | Tachihata et al. ...................... 303/150 |

FOREIGN PATENT DOCUMENTS

| | | |
|---|---|---|
| 0 630 786 A1 | 12/1994 | European Pat. Off. . |
| 40 34 814 A1 | 5/1992 | Germany . |
| 195 42 295 A1 | 5/1997 | Germany . |
| 195 48 392 A1 | 7/1997 | Germany . |

*Primary Examiner*—Douglas C. Butler
*Attorney, Agent, or Firm*—Herbert L. Lerner; Laurence A. Greenberg; Werner H. Stemer

[57] ABSTRACT

Electrical, continuously acting wheel brake actuators are individually controlled. The following calculation and control procedures are carried out in a control unit: the wheel slip and the wheel acceleration are calculated for each wheel; if the wheel slip or the wheel acceleration exceed a predefined first threshold value, then the respective actual value of the brake pressure is stored; the quotient of the stored actual value and a pressure value which is characteristic of the vehicle is formed for the respective wheel, and the coefficient of friction $\mu$ is thus estimated; and an ABS brake-pressure closed-loop control operation is carried out at the individual wheels using the value.

8 Claims, 2 Drawing Sheets

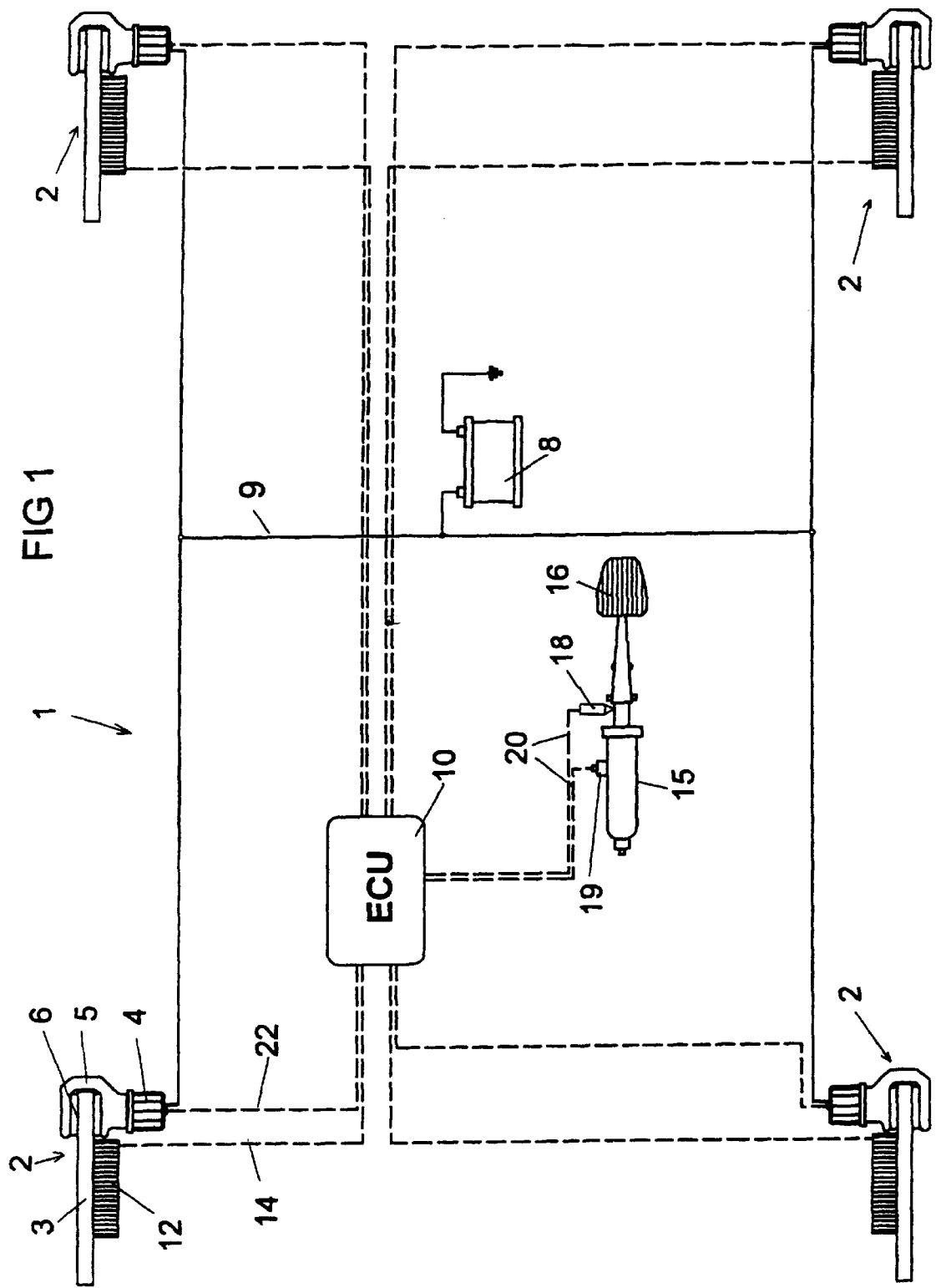

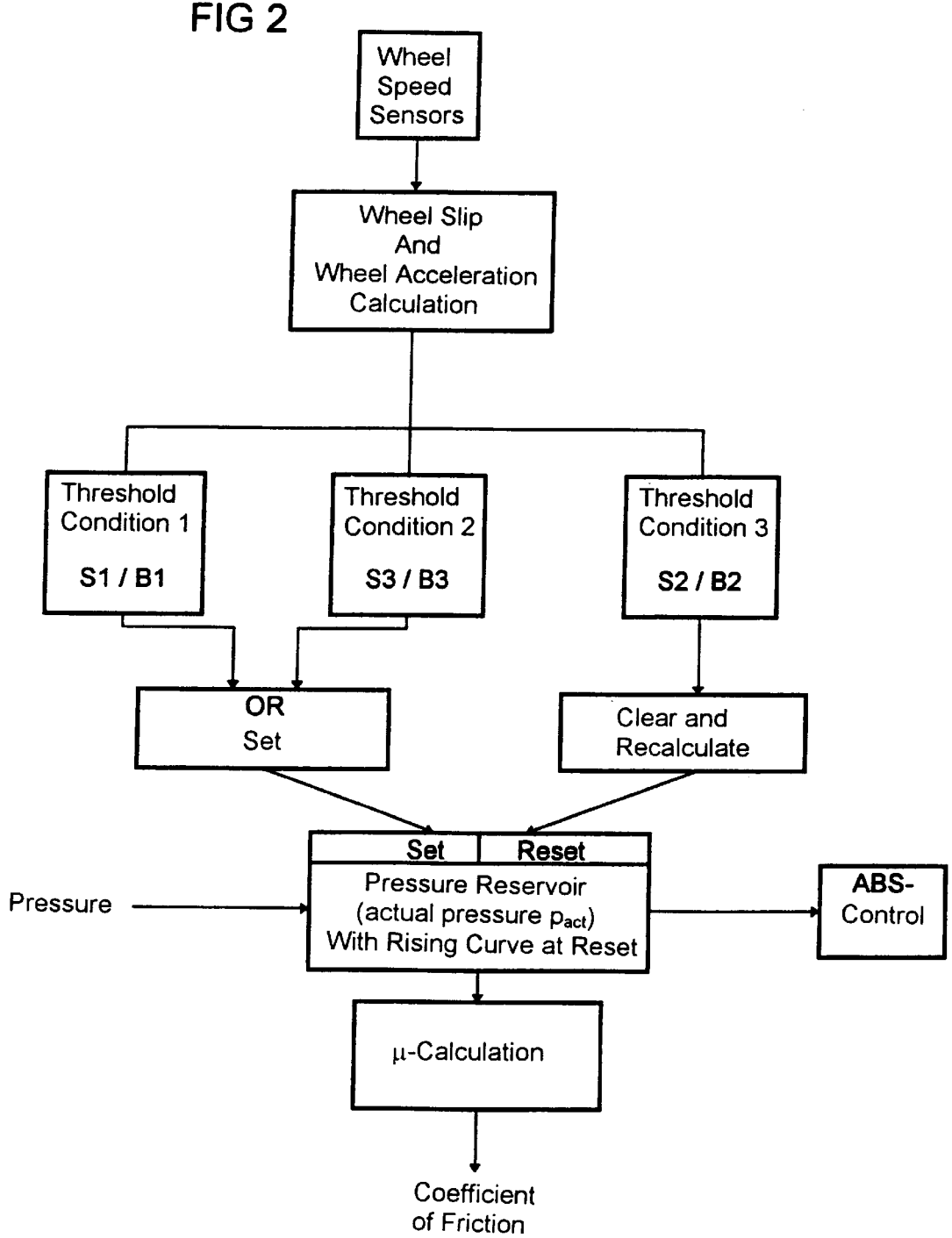

METHOD FOR ELECTRICALLY ACTUATED BRAKING OF A MOTOR VEHICLE AND ELECTRICALLY ACTUATED BRAKE SYSTEM

BACKGROUND OF THE INVENTION

Field of the Invention

New requirements which are placed on the brake systems of motor vehicles—such as, for example, anti-lock systems, drive stability closed-loop control systems, traction controllers, so-called intelligent cruise controls, etc.—have, together with the demand for a reduction in the assembly and maintenance costs, led to the development of new, purely electrically controlled and actuated brake systems (also referred to as brake-by-wire). In a prior art brake system of that kind, the wheel speeds of the individual wheels of the motor vehicle are measured with wheel sensors, and continuously acting wheel brake actuators are electrically controlled on an individual basis such that they apply an independent brake pressure to each wheel. See German published patent application DE 195 48 392 A1. A central control unit evaluates the sensor signals and carries out at the individual wheels a brake-pressure closed-loop control operation to prevent locking.

In another prior art brake system with hydraulically actuated wheel brakes and an individual closed-loop control system for two wheels which are arranged to the left and right of the direction of travel, in order to reduce the yawing moment when there are different coefficients of friction, the braking force at the wheel with the higher coefficient of friction is built up with a delay, kept constant, or reduced. See German published patent application DE 195 42 295 A1. The coefficients of friction are determined there by evaluating the wheel re-acceleration at the wheels after a wheel deceleration. By comparing the detected coefficients of friction at wheels on the right and left sides of the vehicle, it is determined which wheel has the higher coefficient of friction.

Another anti-lock system is described in U.S. Pat. No. 5,312,170 (DE 40 34 814 A1). That system has phases for adjusting to a setpoint slip value and phases for controlling the brake pressure in the case of instabilities of the wheel. The setpoint slip is determined from a detected, maximum coefficient of friction and the controlled brake pressure is determined from the slip value when the maximum coefficient of friction occurs. The anti-lock system is particularly suitable for trucks. The coefficient of friction, the maximum value of the coefficient of friction and also a slip value are determined there using very complex mathematical calculations and approximation methods.

A method of determining a frictional value between a tire and the road surface is described in U.S. Pat. No. 5,513,907 (European published patent application EP 0 630 786 A1). There, the coefficient of friction is determined by continuously measuring the vehicle speed, the rotational speed of a wheel, and the wheel brake pressure. With reference to the angular acceleration of the wheel which is determined from the wheel speed, and with reference to the brake pressure the coefficient of friction is determined as a function of the wheel slip by means of a recursive estimation algorithm and is used for more precisely closed-loop control of the anti-lock system.

A braked wheel should also be prevented from locking in the case of purely electrically actuated brake systems, that is to say they must be provided with an anti-lock system (ABS). Such a system has features in common with conventional anti-lock systems in hydraulic or partially hydraulic brake systems, but it differs from those systems in particular in terms of the actuators. In electrical brake systems, continuously operating actuation elements are used to apply the wheel brake pressure. However, for braking which is as effective as possible but free of locking, precise knowledge of the coefficient of friction between the tire and the underlying surface is important.

SUMMARY OF THE INVENTION

It is accordingly an object of the invention to provide a method for electrically braking a motor vehicle and an electrically actuated brake system, which overcomes the above-mentioned disadvantages of the heretofore-known devices and methods of this general type and which makes use of the advantages of precisely knowing the coefficient of friction between the wheel and the underlying road surface.

With the foregoing and other objects in view there is provided, in accordance with the invention, a method of operating an electrically actuated braking system of a motor vehicle, which comprises the following steps:

measuring wheel speeds of individual wheels of a motor vehicle with wheel sensors;

individually controlling electrical, continuously acting wheel brake actuators such that an independent brake pressure is applied to each wheel of the motor vehicle;

carrying out the following calculation and control procedures in a control unit:

calculating a wheel slip and a wheel acceleration for each wheel;

storing a respective actual value of the brake pressure in case of an upward transgression of a predefined first threshold value for one of the wheel slip and the wheel acceleration;

forming a quotient of the stored actual value and a pressure value that is characteristic of the motor vehicle at a coefficient of friction $\mu=1$ for the respective wheel, and estimating a first coefficient of friction;

carrying out a brake-pressure closed-loop control operation to prevent locking at the individual wheels with reference to the estimated coefficient of friction in accordance with a predefined algorithm;

clearing the first coefficient of friction in case of a downward transgression of a second threshold value for one of the wheel slip and the wheel acceleration, and replacing the first coefficient of friction with a new estimated coefficient of friction that can be increased up to a value for a dry underlying surface; and using the stored brake pressure as a setpoint value for a brake-pressure closed-loop control operation to prevent locking.

In accordance with an added feature of the invention, a further step provides that, in case of a downward transgression of the second threshold value, the wheel brake pressure at an individual wheel is increased until the first threshold value is reached, and then the brake pressure is increased at the respectively other wheels to the corresponding value.

In accordance with an additional feature of the invention, brake fading is taken into account in the estimation of the coefficient of friction.

In accordance with another feature of the invention, if a third threshold value above the first threshold value is exceeded, the actual value of the brake pressure is stored and the earlier determined and stored actual value is thereby overwritten.

In accordance with a further feature of the invention, the method further comprises determining a deceleration that can be achieved and a brake pressure that can be achieved without a tendency to lock from the coefficient of friction determined for the closed-loop control operation to prevent locking.

In accordance with a concomitant feature of the invention, there is used, as the estimated value for the coefficient of friction, a ratio of the stored actual value of the brake pressure to a locking pressure for a respective wheel at a coefficient $\mu=1$.

With the above and other objects in view there is provided an electrically actuated brake system that is operated in accordance with the method as described above.

With the objects in view there is also provided, in accordance with the invention, a brake system for a motor vehicle, comprising:

wheel speed sensors disposed at at least some wheels of a motor vehicle;

electrically actuated, continuously acting wheel brake actuators individually controlled for applying independent brake pressures to respective wheels or each group of wheels;

an electronic control unit connected to the wheel speed sensors and to the wheel brake actuators, the electronic control unit being programmed to:

calculate a wheel slip and a wheel acceleration for each wheel;

store a respective actual value of the brake pressure if a predefined first threshold value for one of the wheel slip and the wheel acceleration is exceeded;

form a quotient of the stored actual value and a pressure value that is characteristic of the vehicle at a coefficient of friction $\mu=1$ for the respective wheel and to estimate a first coefficient of friction;

carry out a brake-pressure closed-loop control operation to prevent locking at the individual wheels with reference to the estimated coefficient of friction and in accordance with a predefined algorithm;

clear the first estimated coefficient of friction if one of the wheel slip and the wheel acceleration falls below a second threshold value, and replacing the first estimated coefficient of friction by a respective new estimated coefficient of friction that can be increased up to a value corresponding to a dry underlying surface; and the electronic control unit controlling the wheel brake actuators with the stored brake pressure as a setpoint value for a brake-pressure closed-loop control operation to prevent locking.

The advantages of the invention lie in particular in the fact that the knowledge of the coefficient of friction gives rise to a precise adjustment with low pressure modulation. This is so because it is possible to determine the maximum deceleration that can be achieved, and thus a maximum brake pressure which can be applied. Furthermore, the coefficient of friction can be used as input variable for a two-track vehicle model. Using this model, essential vehicle parameters which can be used for different vehicle functions (for example slip calculation for ABS and attitude angle calculation for closed-loop control of vehicle dynamics) can be calculated from the wheel speed, steering angle and coefficient of friction input variables.

For analog closed-loop control of the braking procedure in a motor vehicle, the knowledge of the coefficient of friction is particularly useful. Firstly, using an item of information on the coefficient of friction it is possible to improve the slip calculation, and secondly it is possible to improve significantly the closed-loop control quality by adjusting the setpoint brake pressure or the setpoint braking force to a value which is adapted to the friction conditions. Thus, for example, given a coefficient of friction of $\mu=1$ for a given motor vehicle, a locking pressure of 100 bar is necessary, and, on the other hand, given a coefficient of friction $\mu=0.5$ the locking pressure is only approximately 50 bar. From this it is clear that it is not appropriate to apply a relatively high brake pressure as long as the friction conditions between the wheel and the underlying surface do not change.

Other features which are considered as characteristic for the invention are set forth in the appended claims.

Although the invention is illustrated and described herein as embodied in a method for the electrically actuated braking of a motor vehicle and electrically actuated brake system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic plan view of an electrically controlled and actuated brake system of a motor vehicle; and FIG. 2 is a structural chart relating to a method according to the invention taking place in the brake system according to FIG. 1.

DESCRIPTION OF THE PREFERRED EMBODIMENTS

Referring now to the figures of the drawing in detail and first, particularly, to FIG. 1 thereof, there is seen a brake system 1 for a motor vehicle with four wheels. The system includes four brakes 2 which each have a brake disc 3 and an actuation device in the form of a wheel brake actuator 4—also referred to below more simply as an actuator. The wheel brake actuators 4 are integrated into respective brake calipers 5. The actuators 4 and associated calipers 5 each form a unit. The brake caliper 5 is designed as a floating caliper, and by means of brake linings 6 a braking torque is exerted on the brake disc 3 when the wheel brake actuator 4 is actuated.

The wheel brake actuators 4 are supplied with electrical energy from a battery 8 via supply leads 9.

An electronic control unit 10 evaluates signals from wheel speed sensors 12 which are provided on each wheel. The signals of said sensors are fed to the control unit 10 via signal leads 14. The control unit 10 is also connected to a brake value sensor or pedal simulator 15 which is actuated by the driver of the motor vehicle by means of a pedal 16. The pedal-force simulator 15 converts the movement of the brake pedal 16, that is to say the force which is exerted by the driver as usual, and the pedal travel into electrical signals which are fed to the control unit 10 via signal leads 20. The actuation of the pedal is converted by a plurality of sensors—one or two travel sensors 18 and one or two pressure sensors 19—into electrical signals which are fed via signal leads 20 to the control unit 10 and evaluated there.

The control unit determines from the sensor signals setpoint values for actuating the brakes and conveys those values to the individual wheel brake actuators 4 via leads 22. In order to calculate the setpoint values for the wheel brake actuators in the event of an intervention of anti-lock or driving-stability control systems, the control unit 10 evaluates further sensor signals, for example the signals of the wheel speed sensors 12 and signals from lateral acceleration sensors and yaw angle speed sensors which are not explained further here since they are well known to those skilled in the art.

The wheel brake actuators 4 can be provided on each wheel or else only on groups of wheels. They are continuously actuated or positioned electrically and they generate an independent brake pressure for each wheel or for each wheel group.

Referring now to FIG. 2, the following calculations are carried out in the electronic control unit 10:

a) The wheel slip and the wheel acceleration for each wheel are calculated from signals which are supplied by the wheel speed sensors 12.

b) In the case of an upward transgression of a first threshold value S1 for the wheel slip or of a first threshold value B1 for the wheel acceleration (threshold condition 1), the respective brake pressure is stored.

c) An ABS control, that is to say a brake pressure closed-loop control by means of which the braked wheels are prevented from locking is carried out.

d) In the event of a downward transgression of a second threshold value S2 for the slip or of a second threshold value B2 (threshold condition 2) for the wheel acceleration, the stored brake value is increased according to a predefined relationship.

e) The coefficient of friction is calculated or estimated by means of a comparison of the stored brake pressure value and a value of the locking pressure stored for the respective vehicle for a dry road.

f) The stored brake pressure is used as target value for the ABS control, and thus a better control behavior (with lower pressure modulation) is achieved.

Steps a) to f) are continuously processed as a loop.

The wheel speed sensors 12 on each wheel convey a wheel speed signal to the control unit 10. From these wheel speeds, the wheel slip is determined in a known fashion in that, for example, a vehicle reference speed is determined from the fastest non-driven wheel taking into account wheel steering angles, and the slip of a wheel is calculated as a ratio between a measured wheel speed and vehicle reference speed. In addition, a setpoint brake pressure or a setpoint braking force is generated for each wheel as a braking request by the driver, or by an electronic braking system (for example a vehicle dynamic control system). Using an algorithm which is not affected by the present invention, a wheel is prevented from locking in that the setpoint value is reduced.

Independently of this algorithm, the coefficient of friction between the tire and the underlying surface is determined according to the invention as follows:

In the case of an upward transgression of a permanently predefined slip threshold value Sl and/or of a predefined wheel acceleration threshold value B1, the current actual pressure which is generated by the wheel brake actuators 4 is stored. The stored value is retained until there is downward transgression of a second slip threshold value S2 and/or of a wheel acceleration threshold value B2 for a defined time period. Then, the stored value is approximated with a defined rising profile to the setpoint value which has been predefined by the driver or in some other way. The approximation can be carried out according to a predefined exponential rising profile or else according to a profile which is dependent on the parameters of vehicle speed, current pressure level and duration of the downward transgression of the threshold value.

The threshold values S1 and B1 are selected here in such a way that incipient wheel locking is reliably detected, but a simultaneously occurring ABS control operation does not yet influence the pressure too strongly. The second threshold values S2 and B2 and the associated time condition are selected in such a way that the end of the tendency to lock is reliably detected.

The actual pressure $p_{act}$ in the case of the upward transgression of the threshold value at the start of a tendency of the wheel to lock constitutes a measure of the maximum braking force which can be transferred to the underlying surface. If this value is placed in relation to a limit pressure which is typical of the vehicle gives a coefficient of friction of $\mu=1$, an estimated value $\mu_s$ is obtained for the current coefficient of friction.

$$\mu_s = \frac{\text{stored actual pressure}}{\text{locking pressure for the wheel at } \mu = 1} \quad (1)$$

The calculation is carried out for all the controlled wheels individually and then an average value is formed from all the results.

The following must be taken into account in conjunction with equation (1):

I. Brake fading: when the brake heats up, the braking effect decreases with a constant brake pressure. The estimate of the coefficient of friction would therefore be too high. This can be corrected using, for example, a vehicle deceleration calculated from the wheel speeds.

II. The influence of the load status of the vehicle must be taken into account.

III. The influence of cornering (relief from loading and additional loading of individual wheels) is largely already eliminated by the formation of average values between the wheels. The coefficient of friction is no longer valid above a vehicle-dependent cornering speed.

IV. The influence of the angle of inclination of the underlying surface may be ignored within a wide range.

The quality of the estimate therefore depends on different parameters. For a rough estimate (20% accuracy) up to $\mu=0.1$ it is sufficient to take into account the fading and the loading. The method according to the invention has the advantage here that effective brake control with an electrical brake system is easy and simple to carry out and that no additional sensors are necessary for this. In addition, it has proven advantageous to renew the stored coefficient of friction if there is upward transgression of a third threshold value S3 or B3. S3 or B3 here are relatively high values in the vicinity of the locking of the wheels.

The coefficient of friction which is determined in this way is used to adjust the brake-pressure setpoint value which is to be set during the ABS control operation. As a result, a relatively high control quality is achieved in that the brake setpoint value which is influenced by the correction and is predefined by the driver is firstly adapted to the coefficient of friction. If, for example, a coefficient of friction of $\mu=0.5$ is estimated, it is clear that the ABS control, when the locking pressure given a coefficient of friction of $\mu=1$ is 100 bar, expediently operates with a setpoint pressure of approximately 0.5×100 bar+k %. Here, k is a supplement of approximately 10 to 30% in order to compensate for inaccuracies in the estimate.

Using the following equation (2) which is subject to dimensions, the achievable deceleration a and the brake pressure which can be achieved without a tendency to lock are determined from the coefficient of friction $\mu_s$ which is determined for the closed-loop control operation to prevent locking. In this way, a better control behavior with a lower pressure modulation is obtained.

$$a\left[\frac{m}{s^2}\right] = 10 * \eta_s \qquad (2)$$

A further point to be noted is that if the setpoint value which is aimed at by the ABS control is influenced by the $\mu$ estimate, the method according to the invention can be used satisfactorily to estimate a homogenous coefficient of friction or a decreasing coefficient of friction. An increasing coefficient of friction can, however, be determined only slowly, specifically as a function of the rate of increase after downward transgression of the slip threshold.

For this reason, the rise in the stored coefficient of friction after the downward transgression of the thresholds S2 and/or B2 is to be selected to be so steep that in the case of a rapid change from a low coefficient of friction to a high coefficient of friction the higher value is reached quickly enough in order to avoid relatively lengthy underbraking owing to an excessively slow buildup. On the other hand, the rise should not be so steep that it causes the control to become too unsteady as a result of continuous upward transgression of the locking limit.

In this description, the term brake pressure has been widely used, but it is equivalent to the term braking force. Both variables are in a fixed relationship with one another which depends on the geometric dimensions of the brake.

I claim:

1. A method of operating an electrically actuated braking system of a motor vehicle, which comprises the following steps:

measuring wheel speeds of individual wheels of a motor vehicle with wheel sensors;

individually controlling electrical, continuously acting wheel brake actuators such that an independent brake pressure is applied to each wheel of the motor vehicle;

carrying out the following calculation and control procedures in a control unit:

calculating a wheel slip and a wheel acceleration for each wheel;

storing a respective actual value of the brake pressure in case of an upward transgression of a predefined first threshold value for one of the wheel slip and the wheel acceleration;

forming a quotient of the stored actual value and a pressure value that is characteristic of the motor vehicle at a coefficient of friction $\mu=1$ for the respective wheel, and estimating a first coefficient of friction;

carrying out a brake-pressure closed-loop control operation to prevent locking at the individual wheels with reference to the estimated coefficient of friction in accordance with a predefined algorithm;

clearing the first coefficient of friction in case of a downward transgression of a second threshold value for one of the wheel slip and the wheel acceleration, and replacing the first coefficient of friction with a new estimated coefficient of friction that can be increased up to a value for a dry underlying surface; and using the stored brake pressure as a setpoint value for a brake-pressure closed-loop control operation to prevent locking.

2. The method according to claim 1, which further comprises, in case of a downward transgression of the second threshold value, increasing the wheel brake pressure at an individual wheel until the first threshold value is reached, and then increasing the brake pressure at the respectively other wheels to the corresponding value.

3. The method according to claim 1, which further comprises taking into account brake fading in the steps of estimating the coefficient of friction.

4. The method according to claim 1, which further comprises, in case of an upward transgression of a third threshold value above the first threshold value, storing the actual value of the brake pressure and overwriting the earlier determined and stored actual value.

5. The method according to claim 1, which comprises determining a deceleration that can be achieved and a brake pressure that can be achieved without a tendency to lock from the coefficient of friction determined for the closed-loop control operation to prevent locking.

6. The method according to claim 1, which comprises using as the estimated value for the coefficient of friction a ratio of the stored actual value of the brake pressure to a locking pressure for a respective wheel at $\mu=1$.

7. An electrically actuated brake system, comprising a control system operated in accordance with the method according to claim 1.

8. A brake system for a motor vehicle, comprising: wheel speed sensors disposed at at least some wheels of a motor vehicle;

electrically actuated, continuously acting wheel brake actuators individually controlled for applying independent brake pressures to respective wheels or each group of wheels;

an electronic control unit connected to said wheel speed sensors and to said wheel brake actuators, said electronic control unit being programmed to:

calculate a wheel slip and a wheel acceleration for each wheel;

store a respective actual value of the brake pressure if a predefined first threshold value for one of the wheel slip and the wheel acceleration is exceeded;

form a quotient of the stored actual value and a pressure value that is characteristic of the vehicle at a coefficient of friction $\mu=1$ for the respective wheel and to estimate a first coefficient of friction;

carry out a brake-pressure closed-loop control operation to prevent locking at the individual wheels with reference to the estimated coefficient of friction and in accordance with a predefined algorithm;

clear the first estimated coefficient of friction if one of the wheel slip and the wheel acceleration falls below a second threshold value, and replacing the first estimated coefficient of friction by a respective new estimated coefficient of friction that can be increased up to a value corresponding to a dry underlying surface; and said electronic control unit controlling said wheel brake actuators with the stored brake pressure as a setpoint value for a brake-pressure closed-loop control operation to prevent locking.

* * * * *